K. J. BESKOW & A. RAMÉN.
MECHANICAL ROASTING FURNACE.
APPLICATION FILED OCT. 17, 1912.
1,166,654.
Patented Jan. 4, 1916.
2 SHEETS—SHEET 1.
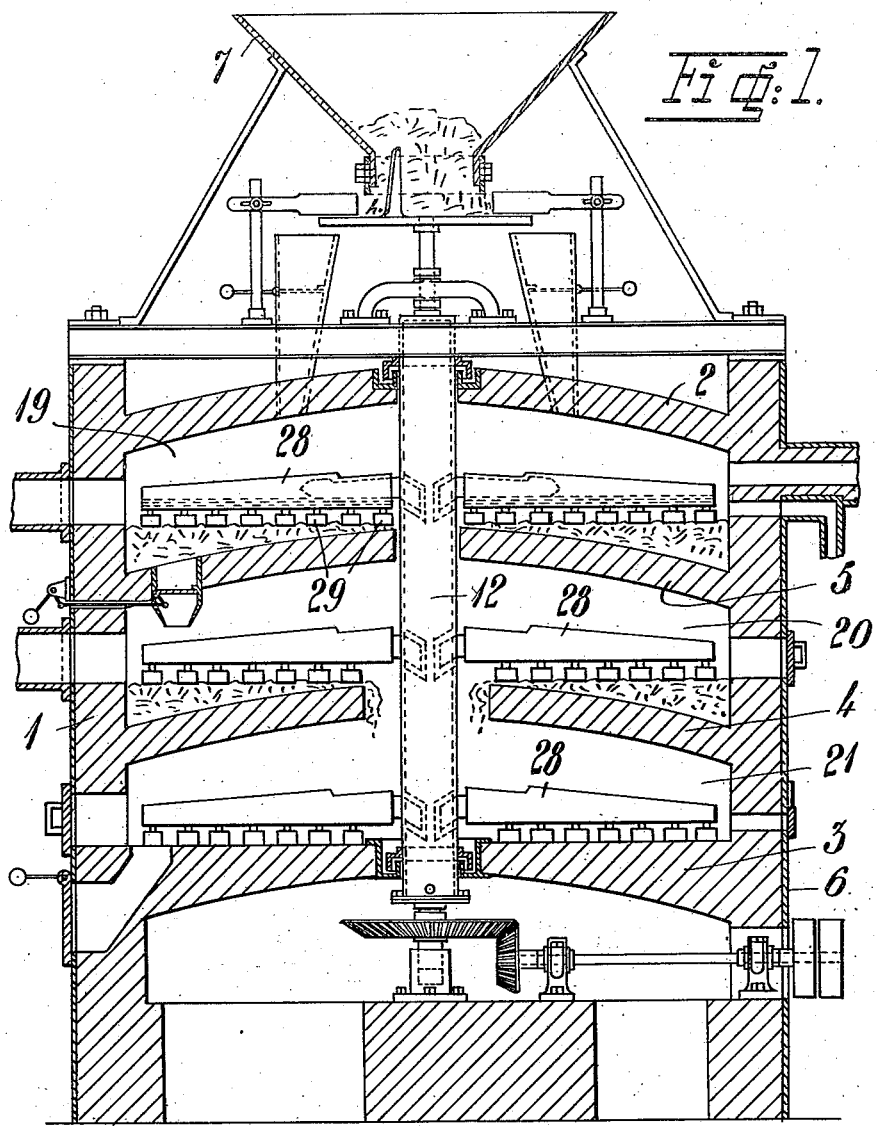

K. J. BESKOW & A. RAMÉN.
MECHANICAL ROASTING FURNACE.
APPLICATION FILED OCT. 17, 1912.
1,166,654.
Patented Jan. 4, 1916.
2 SHEETS—SHEET 2.
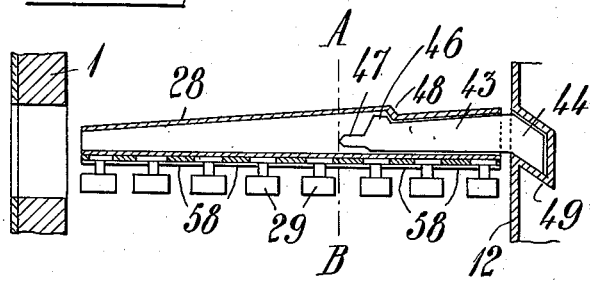
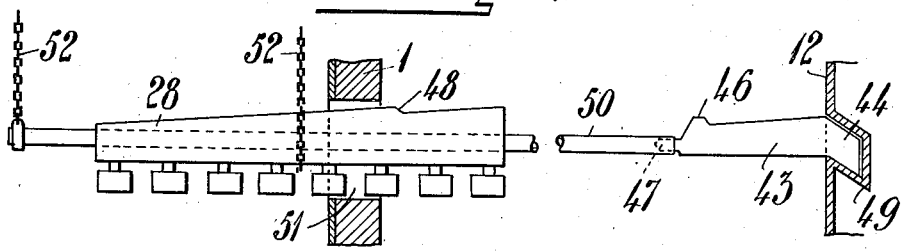
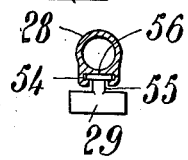

UNITED STATES PATENT OFFICE.

KNUT JAKOB BESKOW AND ARTHUR RAMÉN, OF HELSINGBORG, SWEDEN.

MECHANICAL ROASTING-FURNACE.

1,166,654. Specification of Letters Patent. Patented Jan. 4, 1916.

Original application filed August 18, 1910, Serial No. 577,845. Divided and this application filed October 17, 1912. Serial No. 726,248.

*To all whom it may concern:*

Be it known that we, KNUT JAKOB BESKOW and ARTHUR RAMÉN, subjects of the King of Sweden, residing in Södra Storgatan 19, Helsingborg, in the Kingdom of Sweden, have invented certain new and useful Improvements in Mechanical Roasting-Furnaces, of which the following is a specification.

This is a division of our application, filed on August 18th 1910, Serial No. 577,845, and priority is claimed for the present application from the date of said application.

In mechanical roasting furnaces, wherein the ore to be treated is stirred and transported by means of stirring devices consisting of horizontal arms on vertical shafts provided with scrapers or projections adapted to effect a stirring and transport of the ore, it is desirable to be able to replace these arms, when broken or worn, by new arms without stopping the working of the furnace. In small furnaces in which the stirring arms do not exceed one meter or so in length, this replacing of the arms can usually be carried out without much difficulty, but in furnaces of larger dimensions the stirring arms which are of greater length must, for the sake of sufficient strength be made so heavy that they scarcely can support their own weight at the high temperature prevailing in the furnace. For this reason the stirring arms in such furnaces are usually provided with devices for cooling by means of air or water, with the drawback however that it is impossible to change the arms during the working of the furnace.

Instead of fastening the bearing arm directly onto the shaft, it can be placed upon or inserted into an arm holder, which may be mounted upon the shaft to project therefrom, and which, being of sufficient length, can support an essential part of the weight of the arm, thereby rendering it unnecessary to cool the arm by water or air before it can be removed for the purpose of repair or substitution. The fact that such arm holders have not hitherto been used commonly is due to the fact that no practical means have been invented for connecting the arm to the arm holder, nor for connecting the arm holder to the shaft. During the operation of the furnace the arm must be steady in its position upon the arm holder and the latter must also be just as firmly attached to the shaft. Besides, it must be possible to loosen the arm from the arm holder by a simple manual operation and without having to wait until the furnace becomes cool, so that the arm may be withdrawn from the furnace quickly for the purpose of supervision or substitution. Likewise, it must be possible in the same way and for the same purpose to loosen the arm holder easily from the shaft. Finally, it is of importance that the construction shall not occupy too great a space, especially as to height, whereby the distance between the different arches or intermediate bottoms of the furnace would be increased, which would have a disadvantageous effect upon the working of the furnace and consequently would increase the cost of the same. In order to permit ready exchange of arm holders, according to the present invention, each arm holder is bent angularly and the shaft is provided with correspondingly inclined borings or pockets into which one end or shank of the arm holder may be inserted. Owing to the angular construction of the arm holder and the inclination of the said pockets, the arm holder will be maintained in firm engagement with the pockets by its own weight and will thus be prevented from falling out. The arm holder is protected by the stirring arm against wear and corrosion and can thus be manufactured from "special steel", which, at the temperature prevailing in the furnace, possesses great strength.

In order to illustrate the invention a suitable form of a furnace constructed in accordance therewith is illustrated by way of example in the accompanying drawings, in which:

Figure 1 is a vertical section of the furnace. Fig. 2 is an elevation of part of the central vertical shaft of the furnace with an arm fastened thereto, supporting stirring and transporting devices. Fig. 3 is an elevation of said arm illustrating the inserting of the same in its position. Fig. 4 shows a cross section of the said arm on line A—B in Fig. 2. Fig. 5 shows a part of said arm seen from above.

1 is the brickwork of the furnace, suitably surrounded by a mantle 6 of metal and provided with arches 2 and 3 forming the top and the bottom of the same and it is also provided with intermediate arches or bottoms 4 and 5 (of any suitable number) by means of which the furnace is divided into several divisions or compartments, and 12 is a vertical rotatable shaft centrally arranged in the furnace and carrying devices for stirring and transporting the material through the furnace. As the furnace itself, which is made the subject of another application filed by us on October 17th, 1912, Serial Number 726,247, does not form the subject of the present application but is shown only by way of example, in order to elucidate the use of the stirring devices which are the subject of the present application, a more detailed description of the furnace is considered superfluous.

Within each of the several divisions 19, 20, 21 of the furnace one or several arms 28 removably attached to the rotating shaft 12 extend radially from said shaft. Said arms are provided with scrapers 29 or similar devices extending down into the material resting on the bottom of the corresponding divisions and stirring the same as the arms 28 rotate with the shaft 12. In order that the material may be transported across the furnace to the outlet channels 22, 23, 24 of the several divisions said scrapers may consist of blades which form an oblique angle to the length direction of the arms supporting the same, so that when the shaft rotates, the material in the division 19 is transported from the center to the periphery, where it falls down through the channel 22 into the division 20, in which division the scrapers are so arranged that the material is transported in direction from the periphery to the center, where it falls down through the channel 23 into the division 21, in which division the material is again transported in the same way as in division 19 to the periphery, where it is carried off from the furnace through the channel 24.

In Figs. 2–5 the construction of the arms 28, the scrapers 29 and the manner of fastening these latter to said arms 28 and the fastening of the arms 28 to the shaft 12, is more clearly illustrated. Each arm 28 is mounted upon the free end of a holder 43, the inner end 44 of which is bent down and inserted into a corresponding pocket or boring 49 in the shaft 12. The holder 43 has a tapered end 47 and is provided on its upper surface near its end 47 with a shoulder 46. The inner end of the hollow arm 28 is provided on its upper inner side with an abutment 48, which, when the parts are in working position engages the shoulder 46 as shown in Fig. 2. By this arrangement the arm 28 is locked in position and cannot be removed until its outer end is lifted up so far, that the abutment 48 disengages the shoulder 46. Obviously, if the pocket 49 is given a suitable inclination, the inner end 44 of the holder 43 will by the action of the weight of the holder itself and the arm 28 be locked in proper position. Thus by the present construction the arms 28 are in a simple and efficient manner fastened to the shaft 12 in such a way that they can easily be removed and others substituted therefor when necessary.

Fig. 3 illustrates how a new arm 28 may be placed on the holder, when a change of arms is to be carried out. On the tapered end portion 47 of the holder 43 a long iron tube 50 is mounted from outside the furnace through an opening 51, arranged in the brickwork 1 and normally closed by a shutter (not shown). On this tube 50 the new arm 28 is mounted, whereupon by means of a suspending chain 52 or other suitable devices, the tube 50 and the arm 28 are held in a suitable position for moving the arm on said tube into its position on the holder 43, so that the shoulder 46 on the holder 43 engages the abutment 48 inside the arm 28, whereby the arm 28 will be locked in its position. Thereafter the tube 50 is removed and the opening 51 closed. The removal of an arm is carried out in an analogous manner. As the arm 28 is strengthened by the holder 43 which projects a comparatively great length into the same the arm itself need not be made so strong as otherwise, and on account thereof, its weight may be lessened and consequently it need not be cooled by means of water or air. The holders 43 are protected by the arms 28 from wearing and corroding and therefore they can be made of an expensive material (for instance special steel) of such a kind that it possesses a comparatively great strength even at high temperatures.

In Figs. 2, 4 and 5 is shown how said scrapers 29 may be removably fastened to the arms 28 in such a way, that any one of them may easily be replaced by a new one if worn out or broken. In the under side of the arm 28 is formed a longitudinal groove 54. The scrapers 29 are formed as blades provided with a projection or neck 55 the upper part of which is formed with or united with a rectangular head 56 in shape to the cross section of the groove 54 and adapted to be inserted in said groove 54 from the end of the same. Thus a series of scrapers may be fastened in the groove 54, and the distance between the scrapers is regulated by means of intermediate plates 58, placed between each pair of scrapers. The last scraper in the series is by suitable locking devices (not shown) locked in its position and thereby obviously all the scrapers are locked in position. When a change is to be made the said scrapers are again unlocked, whereafter all the scrapers of a series can easily be removed.

Obviously the invention may be carried out in many ways, without departing from the nature of the invention. Thus, for instance, instead of threading the arms upon the holders the said parts may be arranged in such a way, that the inner end of the arm 28 can be inserted into a corresponding bore or longitudinal hole in the outer end of the holder 43. Also in this case the said parts may be connected with each other in a manner analogous to that above described with reference to Fig. 2.

Having thus described our invention, we declare that what we claim is:—

1. In a roasting furnace of the class described, a vertical shaft having downwardly and inwardly inclined sockets opening through its outer periphery, and angularly bent arm holders adapted to have the inner depending shanks of the same inserted into corresponding pockets in the shaft, the angle of inclination of each socket being such that the corresponding arm holder will be maintained by gravity in engagement therein.

2. In a roasting furnace of the class described, a vertical shaft, an arm holder projecting radially from the shaft and having a reduced outer end, a stirring arm having a longitudinal bore open through its ends, one end of the said arm being adapted to fit over the arm holder to be supported thereby, the furnace being provided in its side wall with an opening with which the stirring arm may register, and a tubular member adapted to be inserted through the said furnace opening and the stirring arm bore for engagement with the reduced end of the arm holder.

In witness whereof we have hereunto set our hands in presence of two witnesses.

KNUT JAKOB BESKOW.
ARTHUR RAMÉN.

Witnesses:
N. PERMON,
OSCAR ÅKERBERG.